(12) United States Patent
Ahmed et al.

(10) Patent No.: US 8,687,743 B2
(45) Date of Patent: Apr. 1, 2014

(54) METHODS AND APPARATUS FOR DETECTING AND DECODING ADAPTIVE EQUALIZATION TRAINING FRAMES

(71) Applicant: Agere Systems LLC, Allentown, PA (US)

(72) Inventors: Yasser Ahmed, Macungie, PA (US); Xingdong Dai, Bethlehem, PA (US); Mohammad S. Mobin, Orefield, PA (US); Lane A. Smith, Easton, PA (US)

(73) Assignee: Agere Systems LLC, Allentown, PA (US)

( * ) Notice: Subject to any disclaimer, the term of this patent is extended or adjusted under 35 U.S.C. 154(b) by 0 days.

(21) Appl. No.: 13/767,307

(22) Filed: Feb. 14, 2013

(65) Prior Publication Data

US 2013/0156086 A1  Jun. 20, 2013

Related U.S. Application Data

(62) Division of application No. 11/967,463, filed on Dec. 31, 2007, now Pat. No. 8,428,195.

(51) Int. Cl.
*H04L 27/06* (2006.01)

(52) U.S. Cl.
USPC ........... 375/340; 375/229; 375/230; 375/231; 375/232; 375/343; 375/346; 375/347; 375/350

(58) Field of Classification Search
USPC ........ 375/231, 340, 229, 230, 232, 343, 346, 375/347, 350
See application file for complete search history.

(56) References Cited

U.S. PATENT DOCUMENTS

| | | | | |
|---|---|---|---|---|
| 6,526,107 | B1 * | 2/2003 | Katoh et al. | 375/368 |
| 7,418,068 | B2 | 8/2008 | Barrett et al. | 375/355 |
| 7,457,531 | B2 | 11/2008 | Filo et al. | 386/326 |
| 8,005,181 | B1 | 8/2011 | Steiner | 375/373 |
| 8,107,499 | B2 * | 1/2012 | Huang et al. | 370/503 |
| 2005/0156645 | A1 | 7/2005 | Hirano | 327/233 |
| 2008/0187085 | A1 | 8/2008 | Nuth | 375/372 |

* cited by examiner

*Primary Examiner* — Dhaval Patel
(74) *Attorney, Agent, or Firm* — Ryan, Mason & Lewis, LLP

(57) ABSTRACT

Methods and apparatus are provided for detecting and decoding adaptive equalization training frames (having a frame marker comprised of a string of binary ones and binary zeroes). Training frames are detected by shifting the received data; inserting at least one binary value at one end of the shifted received data to generate a modified version of the received data; applying a logic function to the received data and the modified version of the received data that identifies when corresponding bit positions have different values; and detecting the frame marker when an output of the logic function has a first binary value in an approximate middle of a string of a second binary value. The training frames are decoded using a distance between the approximate center of the frame marker and a predefined binary value in an output of the logic function.

15 Claims, 5 Drawing Sheets

METHODS AND APPARATUS FOR DETECTING AND DECODING ADAPTIVE EQUALIZATION TRAINING FRAMES

CROSS-REFERENCE TO RELATED APPLICATIONS

This application is a divisional of U.S. patent application Ser. No. 11/967,463, filed Dec. 31, 2007, incorporated by reference herein.

FIELD OF THE INVENTION

The present invention is related to techniques for processing a received frame delimited by a frame marker in a communication system and, more particularly, to techniques for decoding adaptive equalization training frames.

BACKGROUND OF THE INVENTION

10 Gigabit Ethernet (10 GbE) is a set of Ethernet standards with a nominal data rate of 10 Gbit/s. 10 GbE over fiber, copper cabling and twisted pair are specified by the IEEE 802.3 standard. IEEE 802.3 is a collection of standards defining the physical layer, and the media access control (MAC) sublayer of the data link layer for wired Ethernet. IEEE 802.3ap, for example, provides a standard for Backplane Ethernet over printed circuit boards, with rates of 1 and 10 Gbit/s.

The IEEE 802.3ap standard defines the physical medium dependent sublayer (PMD) control function. The PMD control function implements the 10 GBASE-KR start-up protocol, which provides a mechanism through which the local receiver can tune the link-partner transmit equalizer to optimize performance over the backplane interconnect, and to inform the link partner when training is complete and it is ready to receive data. This mechanism is implemented through the continuous exchange of fixed-length training frames. These training frames are used by the two physical layer devices to exchange control and status information necessary to configure the adaptive equalization filters for both devices.

The training frames include long trails of ones and zeros (up to 16 ones and 16 zeros length). A Clock and Data Recovery (CDR) device, however, may not be able to maintain lock during these long trails of ones and zeros, potentially resulting in bit shifts in the recovered data. A need therefore exists for improved methods and apparatus for decoding such training frames.

SUMMARY OF THE INVENTION

Generally, methods and apparatus are provided for detecting and decoding adaptive equalization training frames. According to one aspect of the invention, a training frame is detected in received data. The training frame is comprised of a frame marker having a string of a predefined length of binary ones and a string of a predefined length of binary zeroes. The training frame is detected by shifting the received data by one or more bit positions; inserting at least one predefined binary value at one end of the shifted received data to generate a modified version of the received data; applying a logic function (such as an exclusive or function) to the received data and the modified version of the received data, wherein the logic function identifies when corresponding bit positions in the received data and the modified version of the received data have different values; and detecting the frame marker when an output of the logic function has a first binary value in an approximate middle of a predefined number of a second binary value.

The validity of the frame marker can be evaluated by determining if the received data has a programmable number of a first binary value and a programmable number of a second binary value, for example, for a predefined number of consecutive frames. A further test can optionally ensure that the programmable number of consecutive frames is received at an approximate expected frame rate.

According to another aspect of the invention, a decoding technique is provided for decoding received training frames. The training frames have a frame marker and have been encoded using a Differential Manchester Encoding technique. The training frames are decoded by detecting an approximate center of the frame marker; shifting the received data by one or more bit positions; inserting at least one predefined binary value at one end of the shifted received data to generate a modified version of the received data; applying a logic function (such as an exclusive or function) to the received data and the modified version of the received data, wherein the logic function identifies when corresponding bit positions in the received data and the modified version of the received data have different values; and decoding at least a portion of the received training frame using a distance between the approximate center of the frame marker and a predefined binary value in an output of the logic function. The decoded portions can comprise one or more of a coefficient update field and a status report field.

Generally, the predefined binary value in the output of the logic function corresponds to a transition in the received training frame encoded using a Differential Manchester Encoding technique. The exemplary method optionally ensures that at least a portion of the received training frame has substantially similar content over a plurality of consecutive frames.

A more complete understanding of the present invention, as well as further features and advantages of the present invention, will be obtained by reference to the following detailed description and drawings.

DETAILED DESCRIPTION

The present invention provides methods and apparatus for detecting and decoding adaptive equalization training frames, such as training frames for a 10 GBASE-KR physical layer device as defined by IEEE 802.3ap. As indicated above, the 10 GBASE-KR start up protocol as defined by the standard includes the requirement for transmitting/receiving fixed length training frames. These training frames are used by the two physical layer devices to exchange control and status information necessary to configure the adaptive equalization filters for both devices.

Figure 1:
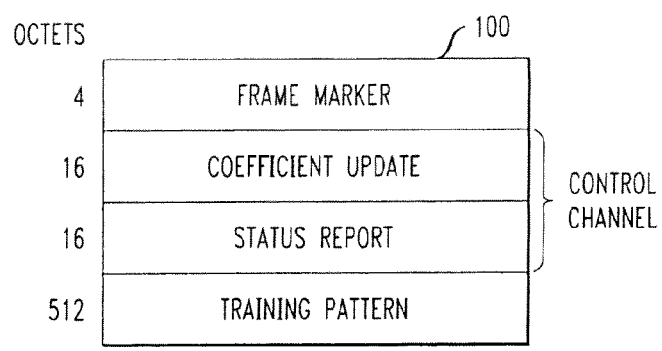
FIG. 1 illustrates an exemplary training frame structure in accordance with the IEEE 802.3ap standard.

FIG. 1 illustrates an exemplary training frame structure 100 in accordance with the IEEE 802.3ap standard. As shown in FIG. 1, the exemplary training frame structure 100 comprises a four octet frame marker, a 16 octet (1 octet=8 bits) coefficient update, a 16 octet status report and a 512 octet training pattern. The four octet frame marker delimits each frame using a 32-bit pattern, hexadecimal FFFF0000. This pattern is said to provide a unique indication of the start of a training frame. The next two fields for the coefficient update and status report (256 bits) are transmitted using Differential Manchester Encoding (DME), as discussed further below in conjunction with FIG. 2. Finally, the 512 octet training pattern is transmitted.

A 10 GBASE-KR device is required to transmit and receive training frames 100 during the startup protocol. The training frames are transmitted (and received) repeatedly until both devices reach an agreement on the control information necessary to configure their adaptive equalization filters. Each frame includes 4384 bits of data. These bits are transmitted at the 10G speed (1 bit per Unit Interval).

As indicated above, the 32-bit pattern, hexadecimal FFFF0000, is a long trail of ones and zeros (up to 16 ones and 16 zeros length). A Clock and Data Recovery (CDR) device, however, may not be able to maintain lock during these long trails of ones and zeros, potentially resulting in bit shifts in the recovered data.

The following are some examples of the first 64-bits in a training frame 100, where the most significant bit (MSB) is assumed to be received first:

1) Good Frame Marker (CDR maintains lock during the reception of this frame): 1111_1111_1111_1111_0000_0000_0000_0000_1111_0000_1111_1111_0000_1111_1111_0000_1111_0000_1111

2) Bad Framer Marker (one bit is lost in the middle of the marker): 1111_1111_1111_1110_0000_0000_0000_0000_1111_0000_1111_1111_0000_1111_0000_1111

3) Bad Framer Marker (one bit is lost at the start of the marker): 0111_1111_1111_1111_0000_0000_0000_0000_1111_0000_1111_1111_0000_1111_0000_1111

The disclosed detection and decoding method accommodates these possible bit shifts in the recovered data, which are even more likely during the initial startup/communication when the equalization parameters have not been optimized. Thus, one aspect of the invention provides an efficient and reliable method for detecting and decoding adaptive equalization training frames 100, such as those specified for a 10 GBASE-KR physical layer device. Generally, the disclosed techniques locate the 0-to-1 and 1-to-0 transitions and allow for +/−1 UI error in these locations in the exemplary embodiment. The distance between these transitions is used to decode the received frames.

Figure 2:
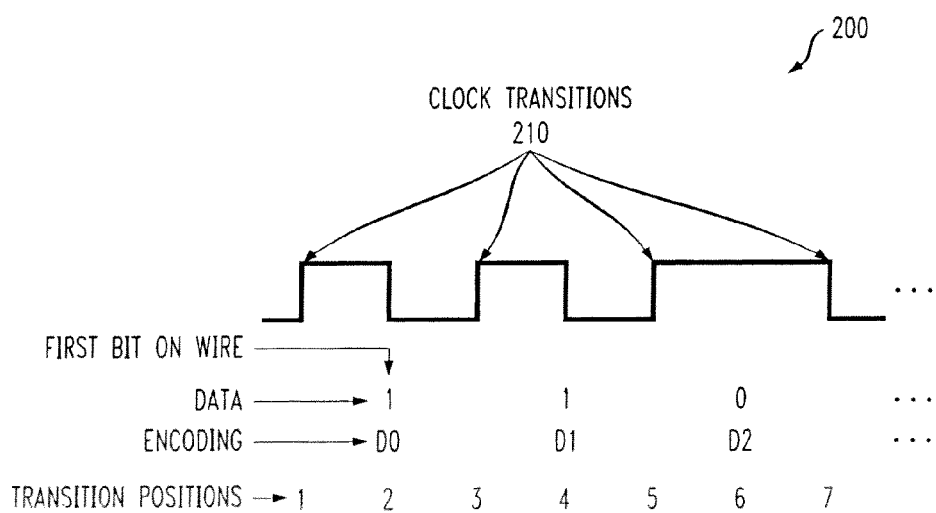
FIG. 2 illustrates a Differential Manchester Encoding (DME) process according to the IEEE P802.3ap standard.

FIG. 2 illustrates a DME encoding process 200 according to the IEEE P802.3ap standard. As shown in FIG. 2, every eight bit window corresponds to one bit for DME encoding. If there is a transition 210 in an eight bit window, then the DME value is one, otherwise the DME value is zero.

Figure 3:
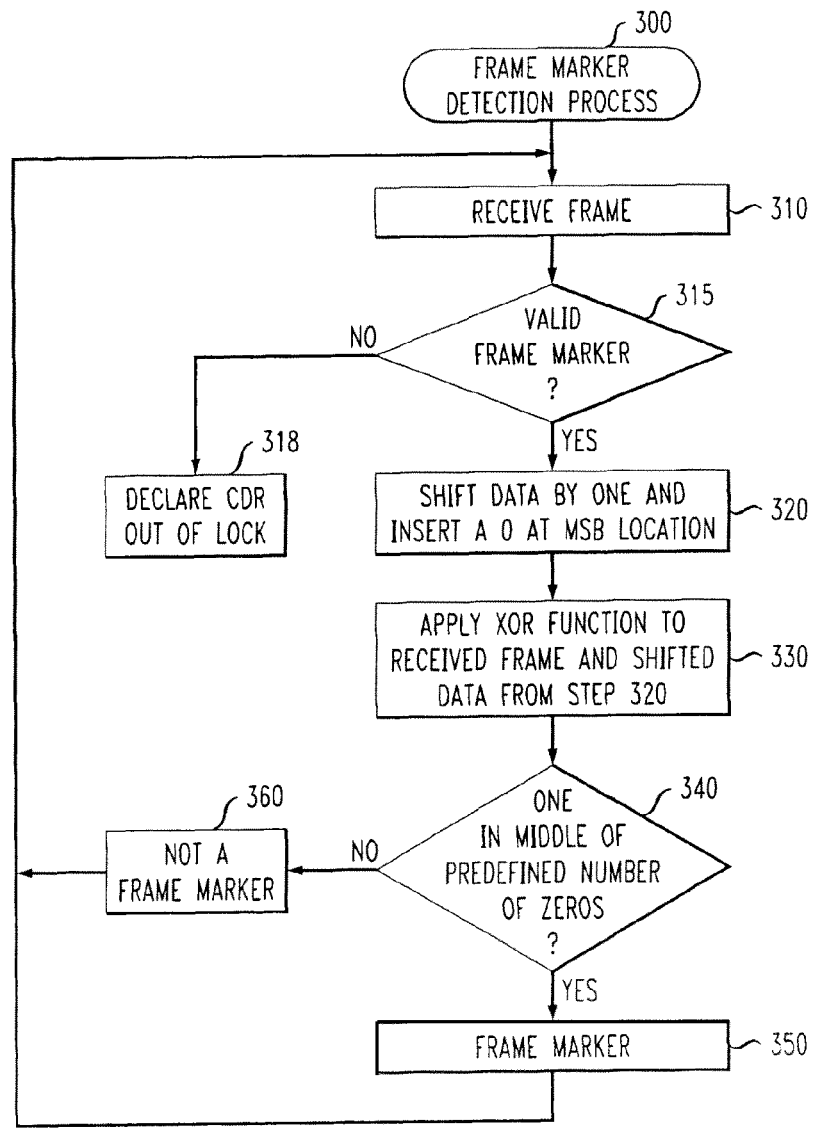
FIG. 3 is a flow chart describing an exemplary frame marker detection process incorporating features of the present invention.

FIG. 3 is a flow chart describing an exemplary frame marker detection process 300 incorporating features of the present invention. As shown in FIG. 3, the frame marker detection process 300 initially receives a frame during step 310. For example, the first 64 bits of the received frame may be: 1111_1111_1111_1111_0000_0000_0000_0000_1111_0000_1111_1111_0000_1111_0000_1111, where it is again assumed that the MSB is received first.

A test is optionally performed during step 315 to determine if a valid frame marker is detected. For example, the test during step 315 can determine if there are a string of ones having a predefined length (such as a value between 12 and 16), followed by a string of zeroes. The test may also further require that the test is satisfied over a predefined number of consecutive frames (such as five consecutive frames). If it is determined during step 315 that the test is satisfied, then program control proceeds to step 320. If, however, it is determined during step 315 that the test is not satisfied, then the frame marker detection process 300 can declare that the CDR is out of lock during step 318.

During step 320, the data is shifted by one position and a 0 is inserted at the leading MSB location, as follows: 0111_1111_1111_1111_1000_0000_0000_0000_0111_1000_0111_1111_1000_0111_1000_0111.

Thereafter, during step 320 the original 64-bits of the received frame are XORed with the shifted 64-bits from step 320 to produce the following word: 1000_0000_0000_0000_1000_0000_0000_0000_1000_1000_1000_0000_1000_1000_1000_1000.

Figure 4:
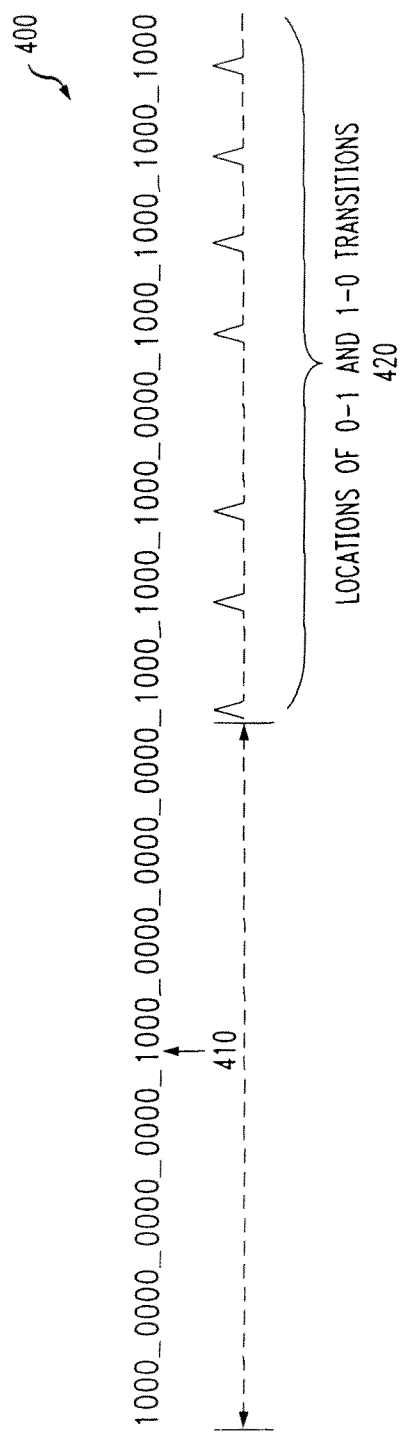
FIG. 4 illustrates the exemplary output of the XOR function of FIG. 3.

FIG. 4 illustrates the exemplary output of the XOR function of step 330. As shown in FIG. 4, a binary one in the approximate middle 410 of a predefined number zeroes (such as 29, 30 or 31 zeroes) indicates a frame marker in accordance with the present invention. Referring back to FIG. 3, a test is performed during step 340 to determine if a frame has been detected. Once such a one among a string of zeroes is detected, its location is saved as the potential center of a good frame marker. In one variation, the validity of this potential frame marker is optionally established by detecting a number of these markers coming at the frame rate (4384 bits at 10 G speed) as per the IEEE P802.3ap standard.

Figure 5:
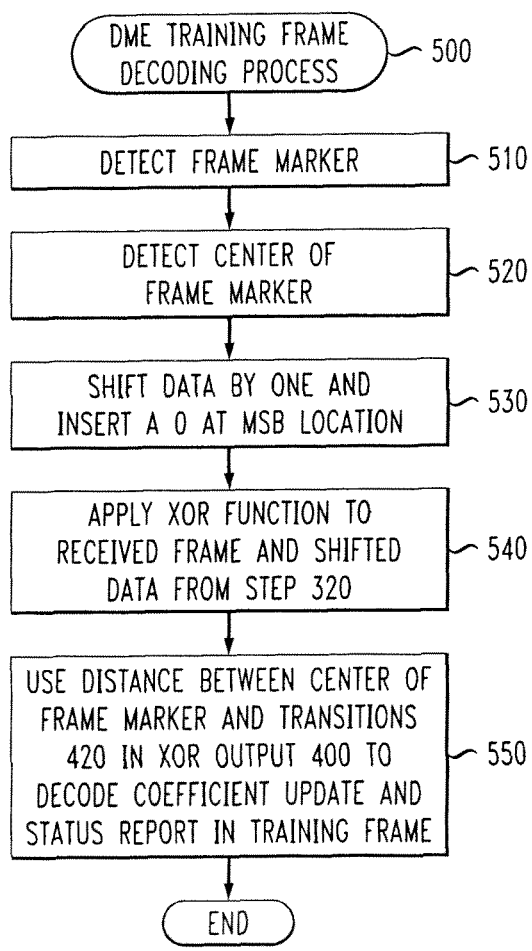
FIG. 5 is a flow chart describing an exemplary DME training frame decoding process incorporating features of the present invention.

FIG. 5 is a flow chart describing an exemplary DME training frame decoding process 500 incorporating features of the present invention. As shown in FIG. 5, the DME training frame decoding process 500 initially detects frame marker of the training frame during step 510. For example, the frame marker detection process 300 may be employed during step 510. Thereafter, the DME training frame decoding process 500 detects the center of the frame marker during step 520.

During step 530, the data is shifted by one position and a 0 is inserted at the leading MSB location, as discussed above in conjunction with FIG. 3. Thereafter, during step 540, the original 64-bits of the received frame are XORed with the shifted 64-bits from step 530, to obtain the result 400 shown in FIG. 4. In this manner, the received frame is convert to automatically identify the transitions 420. As previously indicated, DME encoding employs a transition in an 8 bit window to indicate a particular binary value.

The distance between the center 410 of the frame marker and the transitions 420 in the XOR output 400 are used during step 550 to decode the coefficient update and status report fields of the training frame 100. A consistency check can optionally be applied to the decoded coefficient update and status report fields of the training frame 100. For example, the DME training frame decoding process 500 can require that the content of the coefficient update and status report fields of the training frame 100 must repeat over a predefined number of frames, to ensure reliability.

Figure 6:
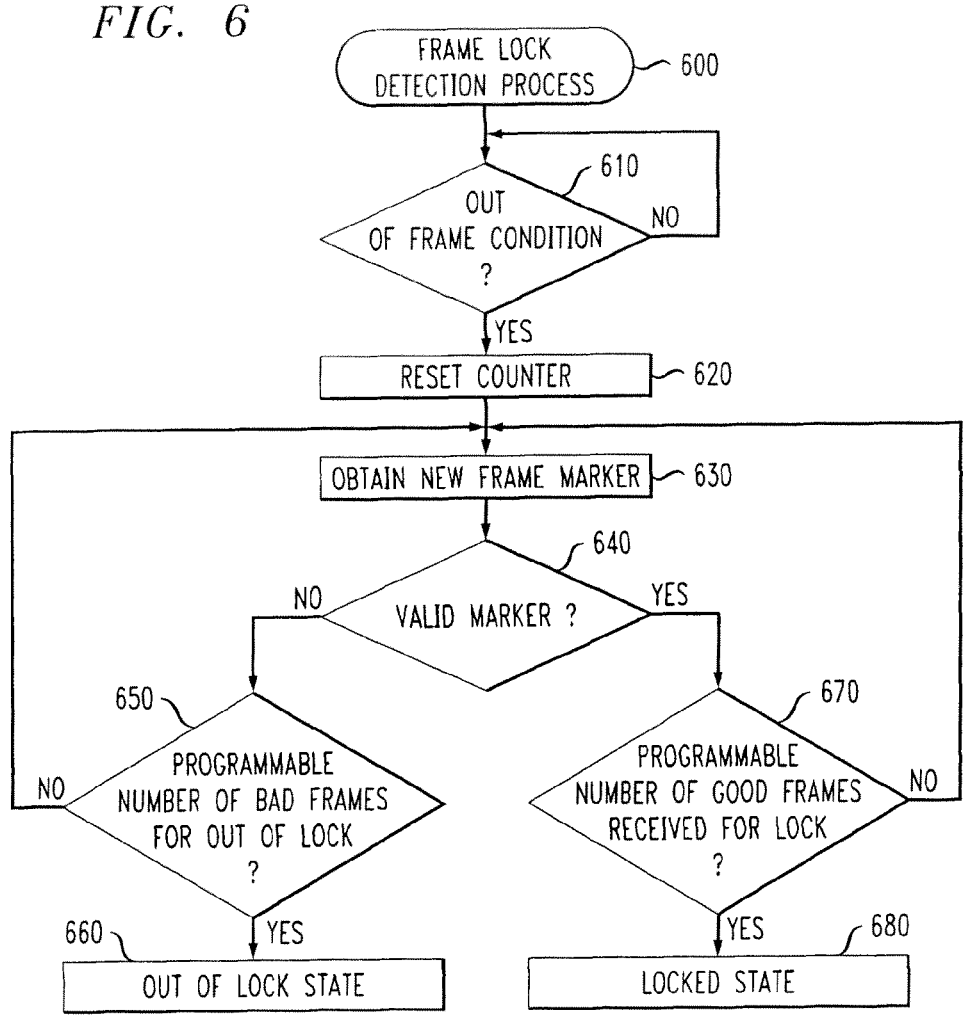
FIG. 6 is a flow chart describing an exemplary frame lock detection process incorporating features of the present invention.

FIG. 6 is a flow chart describing an exemplary frame lock detection process 600 incorporating features of the present invention. As shown in FIG. 6, the frame lock detection process 600 initially performs a test during step 610 until an out of frame condition is detected. Once the out of frame condition is detected, a counter is reset during step 620. Thereafter, anew frame marker is obtained during step 630 and a test is performed during step 640 to determine if the obtained frame marker is valid, for example, as discussed above in conjunction with FIG. 3.

If it is determined during step 640 that the obtained frame marker is not a valid frame marker, then a further test is performed during step 650 to determine if a programmable number of bad frames have been received to declare an out of lock condition. If it is determined during step 650 that the programmable number of bad frames have not been received, then program control returns to step 630 and continues in the manner described above. If, however, it is determined during step 650 that the programmable number of bad frames have been received, then an out of lock condition is declared during step 660.

If it is determined, however, during step 640 that the obtained frame marker is a valid frame marker, then a further test is performed during step 670 to determine if a programmable number of good frames have been received to declare a lock condition. If it is determined during step 670 that the programmable number of good frames have not been received, then program control returns to step 630 and continues in the manner described above. If, however, it is determined during step 670 that the programmable number of good frames have been received, then a lock condition is declared during step 680.

It is noted that the training and coefficient update processes can be performed pursuant to the IEEE P802.3ap standard (FIGS. 72-5 and 72-6, respectively). In one exemplary implementation, the training and coefficient update processes can be performed in software while the frame locking techniques described herein are performed in hardware.

Figure 7:
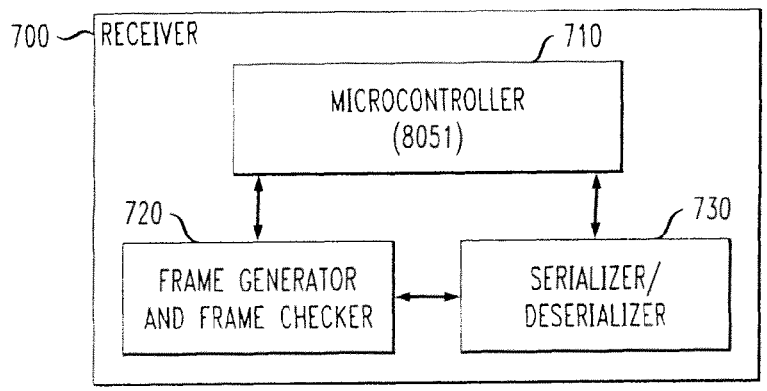
FIG. 7 is a schematic block diagram of an exemplary receiver 600 in accordance with an embodiment of the present invention.

FIG. 7 is a schematic block diagram of an exemplary receiver 700 in accordance with an embodiment of the present invention. As shown in FIG. 7, the exemplary receiver 700 includes a microcontroller 710, such as an 8051 microcontroller, a frame generator and frame checker 720 and a serializer/deserializer 730 (SerDes). The microcontroller 710 can optionally control communications with another device, equalization coefficient adjustments and the programmable aspects of the frame locking techniques described in FIGS. 3 and 5. The frame detection and frame locking techniques described herein are typically performed in hardware in the frame generator and frame checker 720. The frame generator and frame checker 720 will store determined values in one or more registers that are accessible by the microcontroller 710.

While FIGS. 3 and 5 show an exemplary sequence of steps, it is also an embodiment of the present invention that the sequence may be varied. Various permutations of the algorithms are contemplated as alternate embodiments of the invention. In addition, while exemplary embodiments of the present invention have been described with respect to processing steps in a software program, as would be apparent to one skilled in the art, various functions may be implemented in the digital domain as digital logic blocks, in hardware by circuit elements or to state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

In addition, while the exemplary embodiments have described using XOR functions, the present invention could also be implemented using XNOR functions (or a combination of XOR and XNOR). If an XNOR function is employed, the frame marker detection process 300 would search for a zero among a string of ones during step 340.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for decoding a received training frame detected in received data, said received training frame having a frame marker and encoded using a Differential Manchester Encoding technique, comprising:

detecting an approximate center of said frame marker;

shifting said received data by one or more bit positions;

inserting at least one predefined binary value at one end of said shifted received data to generate a modified version of said received data;

applying a logic function to said received data and said modified version of said received data, wherein said logic function identifies when corresponding bit positions in said received data and said modified version of said received data have different values; and decoding at least a portion of said received training frame using a distance between said approximate center of said frame marker and a predefined binary value in an output of said logic function.

2. The method of claim 1, wherein said decoded portions comprise one or more of a coefficient update field and a status report field.

3. The method of claim 1, wherein said predefined binary value in said output of said logic function corresponds to a transition in said received training frame encoded using a Differential Manchester Encoding technique.

4. The method of claim 1, wherein said logic function is one or more of an exclusive or function and an exclusive nor function.

5. The method of claim 1, further comprising the step of ensuring that at least a portion of said received training frame has substantially similar content over a plurality of consecutive frames.

6. An apparatus for decoding a received training frame detected in received data, said received training frame having a frame marker and encoded using a Differential Manchester Encoding technique, comprising:

means for detecting an approximate center of said frame marker;

means for shifting said received data by one or more bit positions;

means for inserting at least one predefined binary value at one end of said shifted received data to generate a modified version of said received data;

a logic circuit for processing said received data and said modified version of said received data, wherein said logic circuit identifies when corresponding bit positions in said received data and said modified version of said received data have different values; and a decoder for decoding at least a portion of said received training frame using a distance between said approximate center of said frame marker and a predefined binary value in an output of said logic circuit.

7. The apparatus of claim 6, wherein said decoded portions comprise one or more of a coefficient update field and a status report field.

8. The apparatus of claim 6, wherein said predefined binary value in said output of said logic circuit corresponds to a transition in said received training frame encoded using a Differential Manchester Encoding technique.

9. The apparatus of claim 6, wherein said logic circuit is one or more of an exclusive or function and an exclusive nor function.

10. The apparatus of claim 6, further comprising means for ensuring that at least a portion of said received training frame has substantially similar content over a plurality of consecutive frames.

11. An apparatus for decoding a received training frame detected in received data, said received training frame having a frame marker and encoded using a Differential Manchester Encoding technique, comprising:

a logic circuit for detecting an approximate center of said frame marker;

a data shifting circuit for shifting said received data by one or more bit positions;

a bit generator for inserting at least one predefined binary value at one end of said shifted received data to generate a modified version of said received data;

a logic circuit for processing said received data and said modified version of said received data, wherein said logic circuit identifies when corresponding bit positions in said received data and said modified version of said received data have different values; and a decoder for decoding at least a portion of said received training frame using a distance between said approximate center of said frame marker and a predefined binary value in an output of said logic circuit.

12. The apparatus of claim 11, wherein said decoded portions comprise one or more of a coefficient update field and a status report field.

13. The apparatus of claim 11, wherein said predefined binary value in said output of said logic circuit corresponds to a transition in said received training frame encoded using a Differential Manchester Encoding technique.

14. The apparatus of claim 11, wherein said logic circuit is one or more of an exclusive or function and an exclusive nor function.

15. The apparatus of claim 11, further comprising means for ensuring that at least a portion of said received training frame has substantially similar content over a plurality of consecutive frames.

* * * * *